United States Patent
Kim

(10) Patent No.: US 11,937,115 B2
(45) Date of Patent: *Mar. 19, 2024

(54) METHOD FOR CONSTRUCTING LOGGED MEASUREMENT ENTRY AND DEVICE SUPPORTING THE SAME

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,692

(22) Filed: May 25, 2022

(65) Prior Publication Data

US 2022/0286890 A1   Sep. 8, 2022

Related U.S. Application Data

(63) Continuation of application No. 16/982,170, filed as application No. PCT/KR2019/003835 on Apr. 2, 2019, now Pat. No. 11,363,483.

(30) Foreign Application Priority Data

Apr. 2, 2018   (KR) .................. 10-2018-0038329

(51) Int. Cl.
*H04W 24/10*  (2009.01)
*H04W 24/08*  (2009.01)
*H04W 76/27*  (2018.01)

(52) U.S. Cl.
CPC .......... *H04W 24/10* (2013.01); *H04W 24/08* (2013.01); *H04W 76/27* (2018.02)

(58) Field of Classification Search
CPC ...... H04W 24/10; H04W 24/08; H04W 76/27
(Continued)

(56) References Cited

U.S. PATENT DOCUMENTS 8,731,543 B2 *  5/2014  Jung ............... H04W 24/10
455/425
9,072,004 B2 *  6/2015  Jung ............... H04W 24/10
(Continued)

FOREIGN PATENT DOCUMENTS

EP   2624621        8/2013
EP   2999264 B1 *  8/2017  ............ H04W 24/08

OTHER PUBLICATIONS

3rd Generation Partnership Project; Technical Specification Group Radio Access Network, "Evolved Universal Terrestrial Radio Access (E-UTRA): User Equipment (UE) procedures in idle mode (Release 14)," 3GPP TS 36.304, v14.5.0, Dec. 2017, 49 pages.
(Continued)

*Primary Examiner* — Mong-Thuy T Tran
(74) *Attorney, Agent, or Firm* — Fish & Richardson P.C.

(57) ABSTRACT

Provided are a method of constructing logged measurement entry and a device supporting the method. According to one embodiment of the present disclosure, the method may comprise: receiving a logged measurement configuration from a network; performing measurement logging based on the received logged measurement configuration; and transmitting the logged measurement to the network, wherein when the UE is in any cell selection state, the logged measurement includes indicator indicating that there is no suitable cell or no acceptable cell with available measurement results.

15 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 9,344,911 | B2* | 5/2016 | Lee | ................... H04W 36/0005 |
| 9,544,868 | B2 | 1/2017 | Kobayashi | |
| 9,749,891 | B2* | 8/2017 | Tomala | ................. H04W 24/10 |
| 10,880,768 | B2* | 12/2020 | Tsutsui | .............. H04W 36/0061 |
| 11,363,483 | B2* | 6/2022 | Kim | ....................... H04W 76/27 |
| 11,689,911 | B2* | 6/2023 | Lee | ....................... H04L 1/1812 |
| | | | | 370/329 |
| 2012/0295650 | A1 | 11/2012 | Futaki et al. | |
| 2012/0309404 | A1 | 12/2012 | Suzuki et al. | |
| 2012/0315890 | A1 | 12/2012 | Suzuki et al. | |
| 2013/0010624 | A1 | 1/2013 | He et al. | |
| 2013/0170362 | A1 | 7/2013 | Futaki et al. | |
| 2013/0196650 | A1 | 8/2013 | Futaki | |
| 2013/0252605 | A1 | 9/2013 | Lee et al. | |
| 2014/0056168 | A1 | 2/2014 | Jung et al. | |
| 2014/0317456 | A1* | 10/2014 | Kim | ....................... H04W 24/10 |
| | | | | 714/48 |
| 2015/0031308 | A1 | 1/2015 | Schmidt et al. | |
| 2015/0223094 | A1 | 8/2015 | Tomala et al. | |
| 2015/0373573 | A1* | 12/2015 | Lee | ....................... H04W 24/08 |
| | | | | 370/329 |
| 2016/0192269 | A1 | 6/2016 | Kim et al. | |
| 2016/0255576 | A1 | 9/2016 | Jiang et al. | |
| 2016/0330644 | A1 | 11/2016 | Li et al. | |
| 2016/0353308 | A1 | 12/2016 | Kim et al. | |
| 2017/0105136 | A1 | 4/2017 | Reider et al. | |
| 2017/0272968 | A1* | 9/2017 | Kim | ....................... H04W 24/10 |
| 2017/0295054 | A1 | 10/2017 | Lee et al. | |
| 2018/0242181 | A1 | 8/2018 | Tsutsui | |
| 2019/0200250 | A1 | 6/2019 | Engström et al. | |
| 2020/0029262 | A1* | 1/2020 | Kim | ................... H04W 74/0833 |
| 2020/0100161 | A1 | 3/2020 | Awada et al. | |
| 2022/0124575 | A1* | 4/2022 | Kim | ....................... H04W 36/30 |

OTHER PUBLICATIONS

3rd Generation Partnership Project; Technical Specification Group Radio Access Network, "Evolved Universal Terrestrial Radio Access (E-UTRA); Radio Resource Control (RRC); Protocol specification (Release 15)," 3GPP TS 36.331, v15.0.1, Jan. 2018, 776 pages.
3rd Generation Partnership Project; Technical Specification Group Radio Access Network, "Radio Resource Control (RRC); Protocol specification (Release 15)," 3GPP TS 25.331, v15.1.0, Dec. 2017, 2,314 pages.
EP Extended European Search Report in European Appln. No. 19782117.6, dated Feb. 5, 2021, 15 pages.
Ericsson, "On Event-based Logged Measurement for MDT in NR," R2-1904011, 3 GPP TSG-RAN WG2 #105bis, Xi'an, China, dated Apr. 8-12, 2019, 9 pages.
LG Electronics et al., "Support for Logging of 'Any cell selection' state," R2-1815497, 3GPP TSG-RAN WG2 Meeting #103bis, Chengdu, China, dated Oct. 8-12, 2018, 2 pages.
LG Electronics Inc., "On the need of MDT logging during OOS," R2-104840, 3GPP TSG-RAN2 Meeting #71, Madrid, Spain, dated Aug. 23-27, 2010, 3 pages.
Nokia, Nokia Shanghai Bell, "Detailed requirements on 'UE out of coverage entries'," R2-1901486, 3GPP TSG-RAN WG2 Meeting #105, Athens, Greece, dated Feb. 24-Mar. 1, 2019, 3 pages.
Office Action in Chinese Appln. No. 201980021373.8, dated Jul. 29, 2023, 12 pages (with English translation).

* cited by examiner

METHOD FOR CONSTRUCTING LOGGED MEASUREMENT ENTRY AND DEVICE SUPPORTING THE SAME

CROSS-REFERENCE TO RELATED APPLICATIONS

This application is a continuation of U.S. application Ser. No. 16/982,170, filed on Sep. 18, 2020, which is a National Stage application under 35 U.S.C. § 371 of International Application No. PCT/KR2019/003835, filed on Apr. 2, 2019, which claims the benefit of Korean Patent Application No. 10-2018-0038329, filed on Apr. 2, 2018. The disclosures of the prior applications are incorporated by reference in their entirety.

TECHNICAL FIELD

The present invention relates to a wireless communication system, and more particularly, to a method for constructing logged measurement entry and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, Minimization of drive tests (MDT) is a feature introduced in 3GPP LTE rel-10 to allow the harvesting of network coverage and quality information from customer user equipments (UEs) as they move within the coverage of the radio access network (RAN). This provides better quality data, at a lower cost, than that produced by the RAN operator performing drive testing of the RAN using test UEs.

In the current LTE specification, the UE in RRC_IDLE state performs logged MDT procedure when the UE is camping normally on a serving cell. That is, UE shall be camping on serving cell in RRC_IDLE state to perform logged MDT procedure.

SUMMARY

According to a prior art, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells.

According to an embodiment of the present invention, a method performed by a user equipment (UE) operating in a wireless communication system is provided. The method may comprise: receiving a logged measurement configuration from a network; performing measurement logging based on the received logged measurement configuration; and transmitting the logged measurement to the network, wherein when the UE is in any cell selection state, the logged measurement includes indicator indicating that there is no suitable cell or no acceptable cell with available measurement results.

The available measurement results may include measurement result of a last serving cell.

The method may further comprise: adjusting logging time interval, when the UE is in any cell selection state.

The logging time interval may be adjusted to be shorter.

The method may comprise: starting a periodic logging when a serving cell quality becomes worse than a threshold.

The method may further comprise: stopping the periodic logging, when the serving cell quality becomes better than the threshold.

The method may further comprise: constructing logged measurement entry to include indicator indicating that the UE escapes from out-of-service state, when the UE recovers from the any cell selection state.

The method may further comprise: performing logging available measurement results at a time point that the UE enters the any cell selection state.

The method may further comprising: performing logging available measurement results at a time point that the UE enters camped on normally state.

According to another embodiment of the present invention, a user equipment (UE) in a wireless communication system is provided. The UE may comprise: a memory; a transceiver; and a processor, operably coupled to the memory and the transceiver, and configured to: control the transceiver to receive a logged measurement configuration from a network; perform measurement logging based on the received logged measurement configuration; and control the transceiver to transmit the logged measurement to the network, wherein when the UE is in any cell selection state, the logged measurement includes indicator indicating that there is no suitable cell or no acceptable cell with available measurement results.

The available measurement results may include measurement result of a last serving cell.

The UE may be further configured to: adjust logging time interval, when the UE is in any cell selection state.

The logging time interval may be adjusted to be shorter.

The UE may be further configured to: start a periodic logging when a serving cell quality becomes worse than a threshold.

According to another embodiment of the present invention, a processor for a wireless communication device in a wireless communication system, wherein the processor is configured to control the wireless communication device to: receive a logged measurement configuration from a network; perform measurement logging based on the received logged measurement configuration; and transmit the logged measurement to the network, wherein when the UE is in any cell selection state, the logged measurement includes indicator indicating that there is no suitable cell or no acceptable cell with available measurement results.

According to embodiments of the present invention, network may efficiently figure out the out-of-service area based on the logged measurement results which includes the out-of-service indicator.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
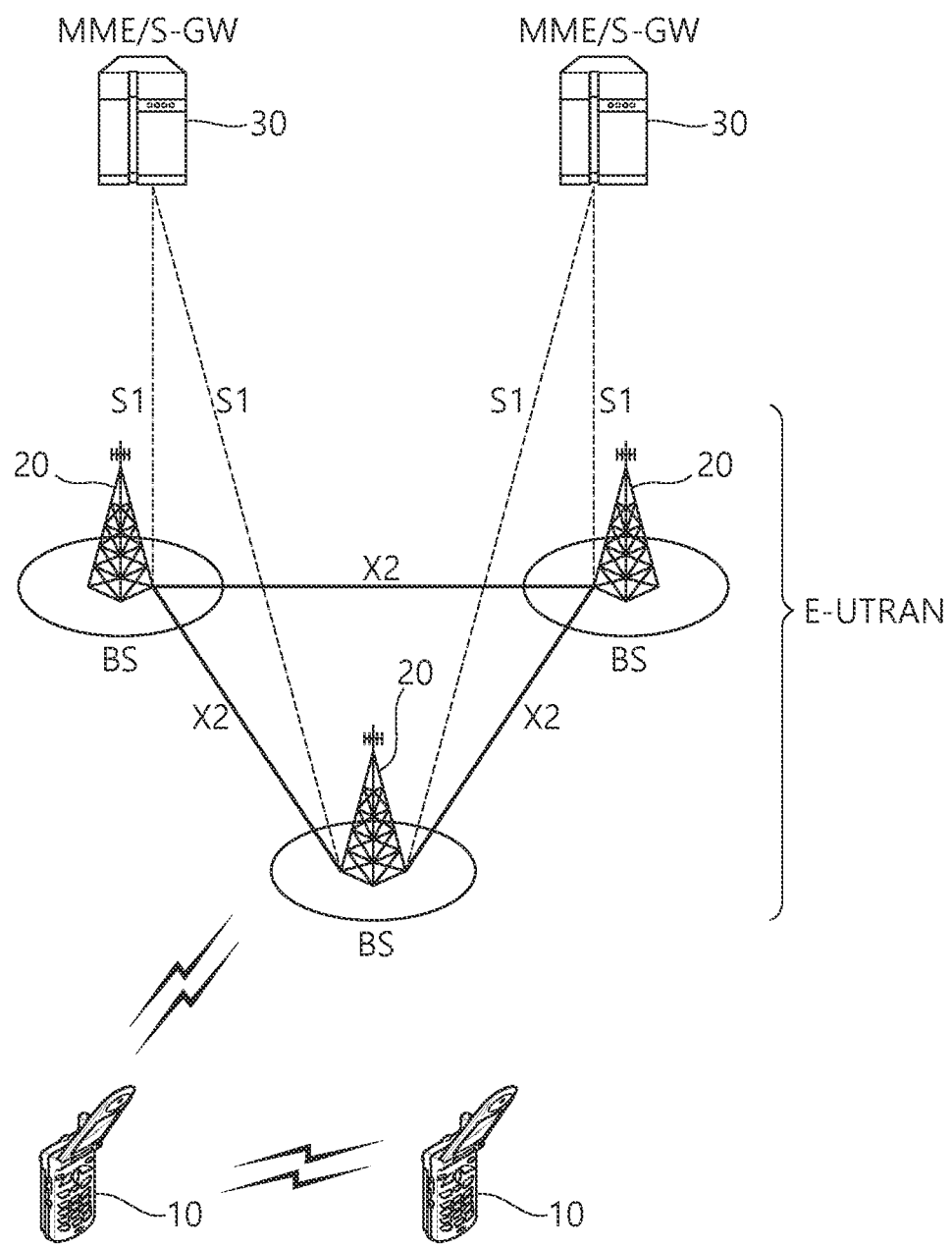
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
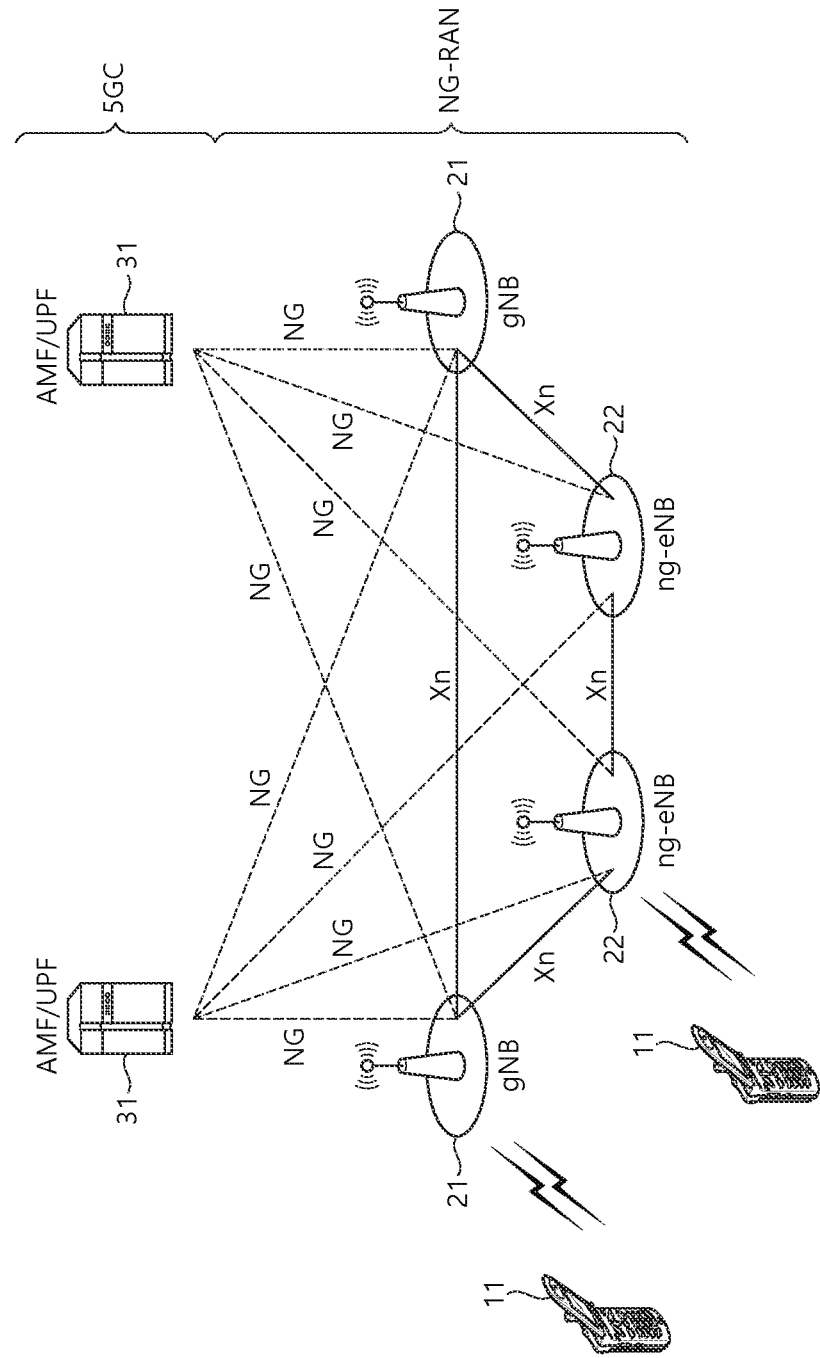
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
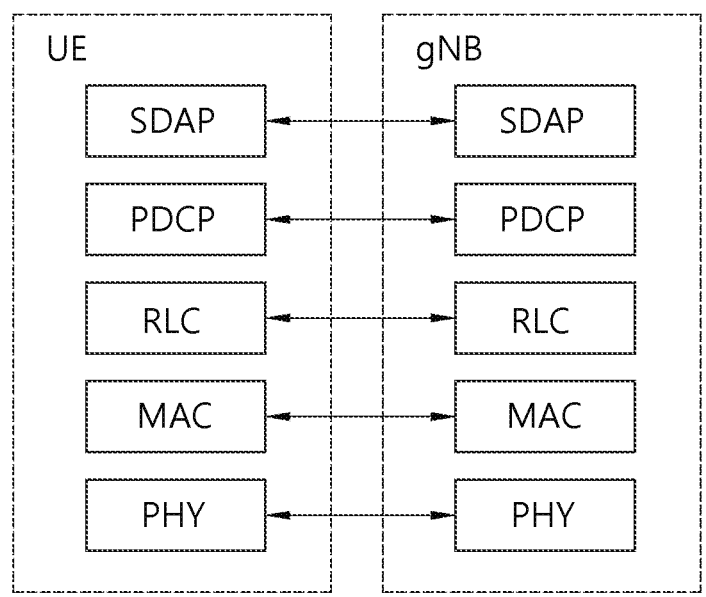
FIG. 3 shows a block diagram of a user plane protocol stack to which technical features of the present invention can be applied.
Figure 4:
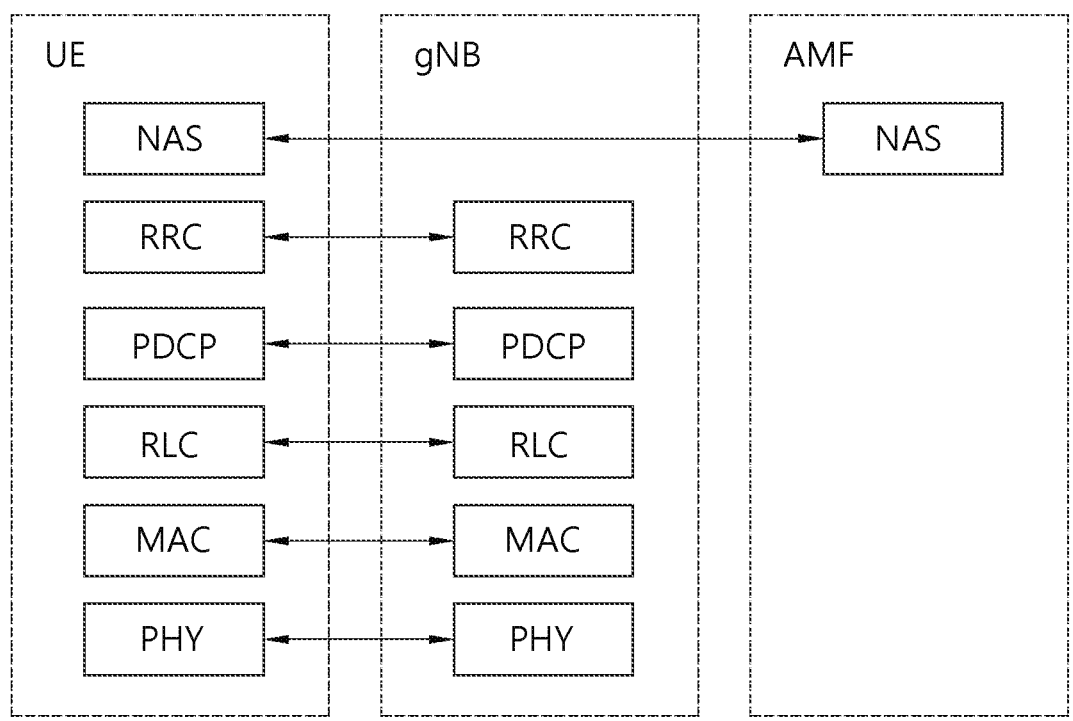
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Logged Minimization of drive tests (MDT) procedures are described. Support of logged MDT complies with the principles for idle mode measurements in the UE. Furthermore, measurement logging is differentiated based on UE states in idle mode, i.e. camped normally, any cell selection or camped on any cell. The UE shall perform measurement logging in "camped normally" state. In "any cell selection" and "camped on any cell" state the UE is not required to perform MDT measurement logging (including time and location information). For logged MDT, the configuration, measurement collection and reporting of the concerning measurement will always be done in cells of the same RAT type.

Logged MDT measurements are configured with a MDT measurement configuration procedure. The network initiates the MDT measurement configuration procedure to the UE in RRC_CONNECTED by sending the LoggedMeasurementConfiguration message, which is used to transfer configuration parameters for logged MDT. This is a unidirectional RRC signaling procedure. A release operation for logged measurement configuration in the UE is realized only by configuration replacement when the configuration is overwritten or by configuration clearance in case a duration timer stopping or expiration condition is met.

The logged measurement configuration consists of followings:

Configuration of the triggering of logging events. Only periodic downlink pilot strength measurement trigger is supported, for which the logging interval is configurable. The parameter specifies the periodicity for storing MDT measurement results. It should be configured in seconds in multiples of the applied IDLE mode discontinuous reception (DRX), i.e. multiples of 1.28 s which is either a factor or multiple of the IDLE mode DRX. The UE behaviour is unspecified when the UE is configured with a DRX cycle larger than the logging interval.

Configuration of the logging duration. This configuration parameter defines a timer activated at the moment of configuration that continues independent of state changes, RAT or registered PLMN (RPLMN) change. When the timer expires the logging is stopped and the configuration is cleared (except for the parameters that are required for further reporting, e.g., network absolute time stamp, trace reference, trace recording session reference and trace collection entity (TCE) identity (Id))

Network absolute time stamp to be used as a time reference to UE

Trace reference parameter as indicated by the operations, administration and management (OAM) configuration Trace recording session reference as indicated by the OAM configuration TCE Id as indicated by the OAM configuration MDT PLMN List, indicating the PLMNs where measurement collection and log reporting is allowed. It is a subset of the equivalent PLMN (EPLMN) list and the RPLMN at logged measurement configuration.

(optionally) Configuration of a logging area. A UE will log measurements as long as it is within the configured logging area.

The configured logging area can span PLMNs in the MDT PLMN List. If no area is configured, the UE will log measurements throughout the PLMNs of the MDT PLMN list.

The logged measurement configuration is provided in a cell by dedicated control while the UE is in RRC_CONNECTED and implies:

logged measurement configuration is active in IDLE UE state in E-UTRAN, or in IDLE mode, CELL_PCH and URA_PCH states in UTRAN until logging duration timer expires or stops logged measurement configuration and logs are maintained when the UE is in any state as described above, despite multiple periods interrupted by UE state transitions, i.e. when the UE is in CONNECTED state for E-UTRAN and CELL_DCH, CELL_FACH state in UTRAN logged measurement configuration and logs are maintained when the UE is in any state as described above in that RAT, despite multiple periods interrupted by UE presence in another RAT There is only one RAT-specific logged measurement configuration for logged MDT in the UE. When the network provides a configuration, any previously configured logged measurement configuration will be entirely replaced by the new one. Moreover, logged measurements corresponding to the previous configuration will be cleared at the same time. It is left up to the network to retrieve any relevant data before providing a new configuration.

When a logging area is configured, logged MDT measurements are performed as long as the UE is within this logging area. If no logging area is configured, logged MDT measurements are performed as long as the RPLMN is part of the MDT PLMN list. When the UE is not in the logging area or RPLMN is not part of the MDT PLMN list, the logging is suspended, i.e. the logged measurement configuration and the log are kept but measurement results are not logged.

In case the new PLMN that does not belong to the MDT PLMN list provides a logged measurement configuration any previously configured logged measurement configuration and corresponding log are cleared and overwritten without being retrieved.

In "camp normally" state, a UE shall perform logging as per the logged measurement configuration. This state includes a period between cell selection criteria not being met and UE entering "any cell selection" state, i.e. 10 s for E-UTRA or 12 s for UTRA. In "any cell selection" or "camped on any cell" state, the periodic logging stops. However, it should be noted that the duration timer is kept running. When the UE re-enters "camped normally" state and the duration timer has not expired, the periodic logging is restarted based on new DRX and logging resumes automatically (with a leap in time stamp).

The measurement quantity is fixed for logged MDT (i.e. not configurable) and consists of both reference signal received power (RSRP) and reference signal received quality (RSRQ) for E-UTRA, both received signal code power (RSCP) and Ec/No for UTRA, primary common control physical channel (P-CCPCH) RSCP for UTRA 1.28 time division duplex (TDD), Rxlev for GERAN, and Pilot Pn phase and pilot strength for CDMA2000 if the serving cell is E-UTRAN cell.

The UE collects MDT measurements and continues logging according to the logged measurement configuration until the UE memory reserved for MDT is full. In this case, the UE stops logging, stops the log duration timer and starts the 48 hour timer.

A UE configured to perform Logged MDT measurements indicates the availability of logged MDT measurements, by means of an indicator, in the RRCConnectionSetupComplete message during connection establishment. Furthermore, the indicator (possibly updated) shall be provided within E-UTRAN handover and re-establishment, and UTRAN procedures involving the change of serving RNC (SRNC) (SRNC relocation), CELL UPDATE, URA UPDATE messages as well as MEASUREMENT REPORT message in case of state transition to CELL_FACH without CELL UPDATE. The UE includes the indication in one of these messages at every transition to RRC Connected mode even though the logging period has not ended, upon connection to RAT which configured the UE to perform Logged MDT measurements and RPLMN which is equal to a PLMN in the MDT PLMN list. The indicator shall be also provided in the UEInformationResponse message during MDT report retrieval in case the UE has not transferred the total log in one RRC message in order to indicate the remaining data availability.

The UE will not indicate the availability of MDT measurements in another RAT or in a PLMN that is not in the MDT PLMN list.

The network may decide to retrieve the logged measurements based on this indication. In case logged MDT measurements are retrieved before the completion of the predefined logging duration, the reported measurement results are deleted, but MDT measurement logging will continue according to ongoing logged measurement configuration. In case the network does not retrieve logged MDT measurements, UE should store non-retrieved measurements for 48 hours from the moment the duration timer for logging expired. There is no requirement to store non-retrieved data beyond 48 hours. In addition, all logged measurement configuration and the log shall be removed by the UE at switch off or detach.

States and state transitions in Idle Mode is described.

Figure 5A:
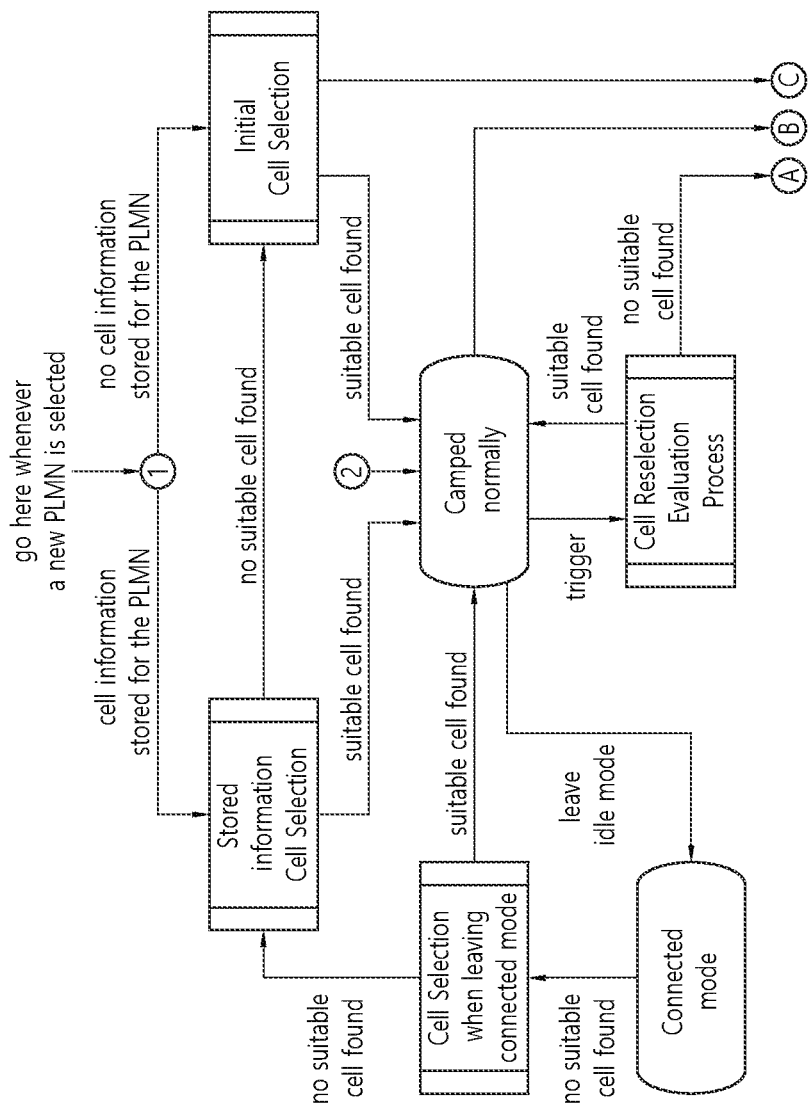
FIG. 5*a* shows states and state transitions and procedures in RRC_IDLE.
Figure 5B:
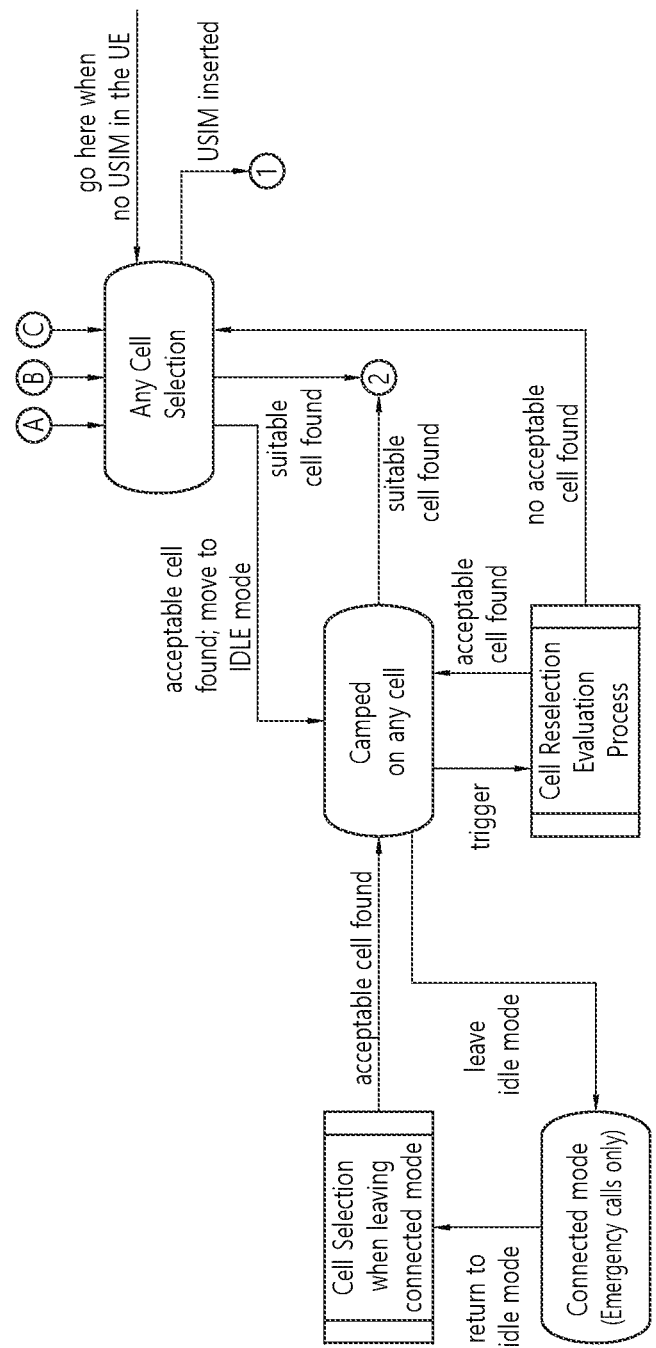
FIG. 5*b* shows states and state transitions and procedures in RRC_IDLE.

FIG. 5a and FIG. 5b show states and state transitions and procedures in RRC_IDLE. Whenever a new PLMN selection is performed, it causes an exit to number 1. FIG. 5a and FIG. 5b may be connected via point A, B and C.

Referring to FIG. 5a and FIG. 5b, while performing initial cell selection procedure, when suitable cell is not found, the UE transits to any cell selection state. Also, when a UE camped normally receive an indication indicating that registration on selected PLMN is rejected from a network, the UE enters the any cell selection state. Also, after cell reselection evaluation process, if suitable cell is not found, the UE enters the any cell selection state. Also, after cell selection when leaving connected mode, if acceptable cell is not found, the UE enters the any cell selection state. Further, a UE without USIM enters the any cell selection state.

Logged measurement configuration procedure is described. The purpose of this procedure is to configure the UE to perform logging of measurement results while in RRC_IDLE and to perform logging of measurement results for MBSFN in both RRC_IDLE and RRC_CONNECTED. The procedure applies to logged measurements capable UEs that are in RRC_CONNECTED. E-UTRAN may retrieve stored logged measurement information by means of the UE information procedure.

Figure 6:
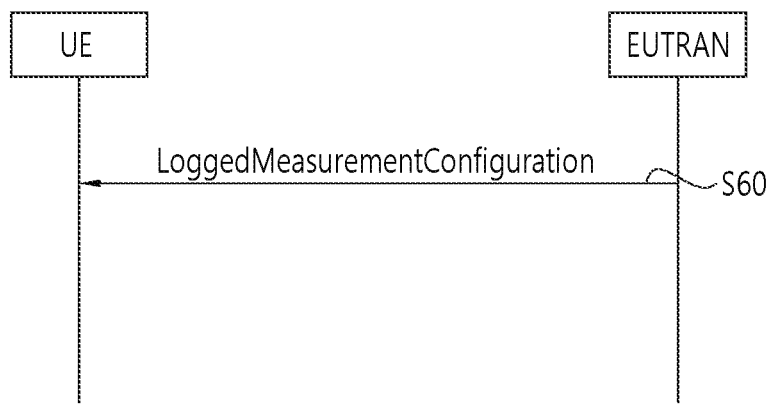
FIG. 6 shows Logged measurement configuration procedure.

FIG. 6 shows Logged measurement configuration procedure. In step S60, E-UTRAN initiates the logged measurement configuration procedure to UE in RRC_CONNECTED by sending the LoggedMeasurementConfiguration message.

Upon receiving the LoggedMeasurementConfiguration message the UE shall:
1> discard the logged measurement configuration as well as the logged measurement information;
1> store the received loggingDuration, loggingInterval and areaConfiguration, if included, in VarLogMeasConfig;
  1> if the LoggedMeasurementConfiguration message includes plmn-IdentityList:
    2> set plmn-IdentityList in VarLogMeasReport to include the RPLMN as well as the PLMNs included in plmn-IdentityList;
  1> else:
    2> set plmn-IdentityList in VarLogMeasReport to include the RPLMN;
  1> store the received absoluteTimeInfo, traceReference, traceRecordingSessionRef and tce-Id in VarLogMeasReport;
  1> store the received targetMBSFN-AreaList, if included, in VarLogMeasConfig;
  1> start timer T330 with the timer value set to the loggingDuration;

Measurements logging procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig.

While T330 is running, the UE shall:
1> if measurement logging is suspended:
  2> if during the last logging interval the IDC problems detected by the UE is resolved, resume measurement logging;
1> if not suspended, perform the logging in accordance with the following:
  2> if targetMBSFN-AreaList is included in VarLogMeasConfig:
    3> if the UE is camping normally on an E-UTRA cell or is connected to E-UTRA; and
    3> if the RPLMN is included in plmn-IdentityList stored in VarLogMeasReport; and
    3> if the PCell (in RRC_CONNECTED) or cell where the UE is camping (in RRC_IDLE) is part of the area indicated by areaConfiguration if configured in VarLogMeasConfig:
      4> for MBSFN areas, indicated in targetMBSFN-AreaList, from which the UE is receiving MBMS service:
        5> perform MBSFN measurements in accordance with the performance requirements;

When configured to perform MBSFN measurement logging by targetMBSFN-AreaList, the UE is not required to receive additional MBSFN subframes, i.e. logging is based on the subframes corresponding to the MBMS services the UE is receiving.
        5> perform logging at regular time intervals as defined by the loggingInterval in VarLogMeasConfig, but only for those intervals for which MBSFN measurement results are available;
  2> else if the UE is camping normally on an E-UTRA cell and if the RPLMN is included in plmn-IdentityList stored in VarLogMeasReport and, if the cell is part of the area indicated by areaConfiguration if configured in VarLogMeasConfig:
    3> perform the logging at regular time intervals, as defined by the loggingInterval in VarLogMeasConfig;
  2> when adding a logged measurement entry in VarLogMeasReport, include the fields in accordance with the following:
    3> if the UE detected IDC problems during the last logging interval:
      4> if measResultServCell in VarLogMeasReport is not empty:
        5> include InDeviceCoexDetected;
        5> suspend measurement logging from the next logging interval;
      4> else:
        5> suspend measurement logging;

The UE may detect the start of IDC problems.
    3> set the relativeTimeStamp to indicate the elapsed time since the moment at which the logged measurement configuration was received;
    3> if detailed location information became available during the last logging interval, set the content of the locationInfo as follows:
      4> include the locationCoordinates;
    3> if WLAN-NameList is included in VarLogMeasConfig:
      4> if detailed WLAN measurements are available:
        5> include logMeasResultListWLAN, in order of decreasing RSSI for WLAN APs;
    3> if BT-NameList is included in VarLogMeasConfig:
      4> if detailed Bluetooth measurements are available:
        5> include logMeasResultListBT, in order of decreasing RSSI for Bluetooth beacons;
    3> if targetMBSFN-AreaList is included in VarLogMeasConfig:
      4> for each MBSFN area, for which the mandatory measurements result fields became available during the last logging interval:
        5> set the rsrpResultMBSFN, rsrqResultMBSFN to include measurement results that became available during the last logging interval;
        5> include the fields signallingBLER-Result or dataBLER-MCH-ResultList if the concerned BLER results are available;
        5> set the mbsfn-AreaId and carrierFrequency to indicate the MBSFN area in which the UE is receiving MBSFN transmission;
      4> if in RRC_CONNECTED:
        5> set the servCellIdentity to indicate global cell identity of the PCell;
        5> set the measResultServCell to include the layer 3 filtered measured results of the PCell;
        5> if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:
          6> for each cell included, include the optional fields that are available;
        5> if available, optionally set the measResultNeighCells to include the layer 3 filtered measured results of neighbouring cell(s) measurements that became available during the last logging interval, in order of decreasing RSCP(UTRA)/RSSI(GERAN)/Pilot- Strength(cdma2000), for at most the following number of cells: 3 inter-RAT cells per frequency (UTRA, cdma2000)/set of frequencies (GERAN), and according to the following:

6> for each cell included, include the optional fields that are available;

4> if in RRC_IDLE:

5> set the servCellIdentity to indicate global cell identity of the serving cell;

5> set the measResultServCell to include the quantities of the serving cell;

5> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency and according to the following:

6> for each neighbour cell included, include the optional fields that are available;

5> if available, optionally set the measResultNeighCells, in order of decreasing ranking-criterion as used for cell re-selection, to include neighbouring cell measurements that became available during the last logging interval, for at most the following number of cells: 3 inter-RAT cells per frequency (UTRA, cdma2000)/set of frequencies (GERAN), and according to the following:

6> for each cell included, include the optional fields that are available;

4> for the cells included according to the previous (i.e. covering previous and current serving cells as well as neighbouring EUTRA cells) include results according to the extended RSRQ if corresponding results are available according to the associated performance requirements;

4> for the cells included according to the previous (i.e. covering previous and current serving cells as well as neighbouring EUTRA cells) include RSRQ type if the result was based on measurements using a wider band or using all OFDM symbols;

The UE includes the latest results in accordance with the performance requirements. E.g. RSRP and RSRQ results are available only if the UE has a sufficient number of results/receives a sufficient number of subframes during the logging interval.

3> else:

4> set the servCellIdentity to indicate global cell identity of the cell the UE is camping on;

4> set the measResultServCell to include the quantities of the cell the UE is camping on;

4> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies (GERAN) per RAT and according to the following:

5> for each neighbour cell included, include the optional fields that are available;

4>0 for the cells included according to the previous (i.e. covering previous and current serving cells as well as neighbouring EUTRA cells) include results according to the extended RSRQ if corresponding results are available according to the associated performance requirements;

4> for the cells included according to the previous (i.e. covering previous and current serving cells as well as neighbouring EUTRA cells) include RSRQ type if the result was based on measurements using a wider band or using all OFDM symbols;

The UE includes the latest results of the available measurements as used for cell reselection evaluation in RRC_IDLE or as used for evaluation of reporting criteria or for measurement reporting in RRC_CONNECTED, which are performed in accordance with the performance requirements.

2> when the memory reserved for the logged measurement information becomes full, stop timer T330 and perform the same actions as performed upon expiry of T330;

In LTE, Minimization of driving test (MDT) was discussed to provide network operators with network performance optimization information in a cost efficient manner. As one of MDT mechanism, logged MDT is a procedure by which the UE in RRC_IDLE performs logging of measurement results and reporting of the logged measurement when the UE enters RRC_CONNECTED state.

In the current LTE specification, the UE in RRC_IDLE state performs logged MDT procedure when the UE is camping normally on a serving cell. That is, UE shall be camping on serving cell in RRC_IDLE state to perform logged MDT procedure. Thus, the current logged MDT procedure may not support to log the information of out-of-service area. Considering that the logged MDT procedure is working for the network operators who want to know the specific status of coverage area, it is needed to propose a solution to support more efficient MDT information including information on out-of-service area in RRC_IDLE or RRC_CONNECTED.

Figure 7:
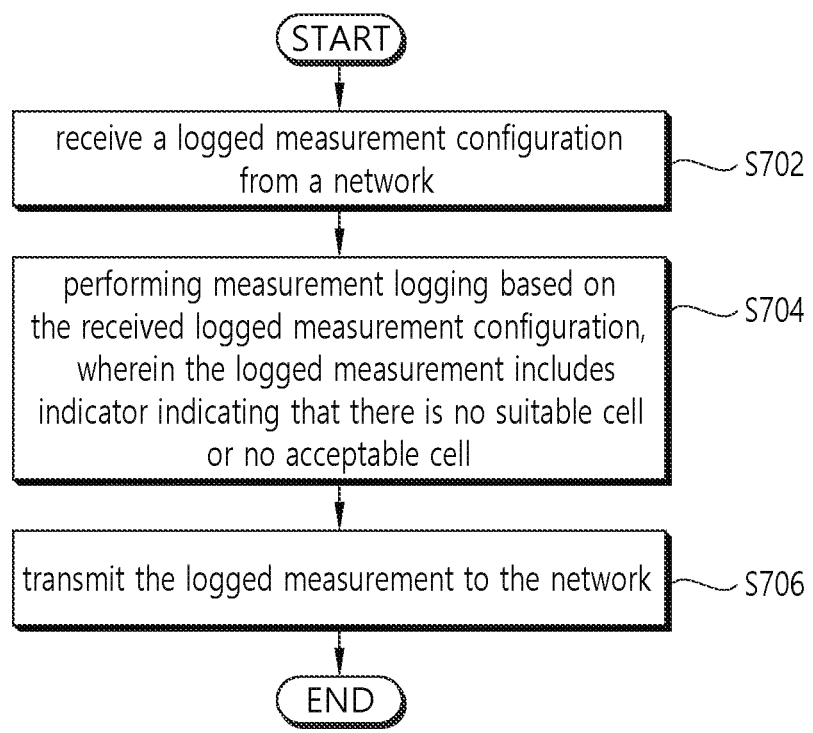
FIG. 7 shows a method for constructing logged measurement entry according to an embodiment of the present invention.

FIG. 7 shows a method for constructing logged measurement entry according to an embodiment of the present invention.

In step S702, the UE may receive a logged measurement configuration from a network.

In step S704, the UE may perform measurement logging based on the received logged measurement configuration. When the UE is in any cell selection state, the logged measurement may include indicator indicating that there is no suitable cell or no acceptable cell with available measurement results. The available measurement results may include measurement result of a last serving cell. The UE may adjust logging time interval, when the UE is in any cell selection state. The logging time interval may be adjusted to be shorter. The UE may further start a periodic logging when a serving cell quality becomes worse than a threshold. The UE may further stop the periodic logging, when the serving cell quality becomes better than the threshold. The UE may further construct logged measurement entry to include indicator indicating that the UE escapes from out-of-service state, when the UE recovers from the any cell selection state. The logged measurement may be constructed when the UE is in radio resource control (RRC) idle state. The UE may further configured to perform logging available measurement results at a time point that the UE enters the any cell selection state. The UE may further configured to perform logging available measurement results at a time point that the UE enters camped on normally state.

In step S706, the UE may transmit the logged measurement to the network. The logged measurement may be transmitted when the UE is in RRC connected state.

According to embodiments of the present invention, network may efficiently figure out the out-of-service area based on the logged measurement results which includes the out-of-service indicator. Specifically, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells. Thus, in the prior art, network cannot infer whether it is out-of-service or not from measurement results only.

According to an embodiment of the present invention, the UE may store or log logged MDT information with information on out-of-service area, when at least one of conditions is satisfied:

If UE is not able to detect any cells for which S criteria is fulfilled.
If no suitable or acceptable cell can be found.
If UE is in any cell selection state.
If UE is in out-of-service.
If serving cell quality, i.e. RSRP, RSRQ or SINR, is lower than a threshold configured by network.

The any cell selection state may be applicable for RRC_IDLE and RRC_INACTIVE state. In any cell selection state, the UE may perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high quality cell. The UE, which is not camped on any cell, shall stay in any cell selection state until an acceptable cell is found. If an acceptable cell is found, the UE shall inform the NAS and camp on this cell and obtain limited service, state Camped on any cell.

An acceptable cell is a cell that the UE may camp on to make emergency calls. There are a number of situations in which the UE is unable to obtain normal service from a PLMN. In this case, the UE may attempt to camp on an acceptable cell. For example, when a failure to find a suitable cell of the selected PLMN is detected, the UE may attempt to camp on an acceptable cell, irrespective of its PLMN identity, so that emergency calls can be made if necessary. In automatic PLMN selection mode, failure to find a suitable cell of the selected PLMN may cause a new PLMN selection, but even in this case, the situation may arise when no PLMNs are available and allowable for use. If the user does not select a PLMN, the selected PLMN shall be the one that was selected before the PLMN selection procedure started. If no such PLMN was selected or that PLMN is no longer available, then the MS shall attempt to camp on any acceptable cell and enter the limited service state. In this reason, the UE camping on acceptable cell may be assumed to be in out-of-service state or any cell selection state in some embodiments of the present invention.

Hereinafter, for purposed of simplicity, it may be assumed that the UE is in any cell selection state. Although the UE is assumed in any cell selection in this description, other conditions referred above may be applied to the embodiment of the present invention of course. Whether the conditions are met is determined based on quality of the serving cell or neighbor cell.

According to an embodiment of the present invention, the UE in RRC_IDLE state may perform the logged MDT procedure at regular time intervals even though the UE is in any cell selection state, e.g. even though the UE is not camped on a cell normally. When UE performs logging, the UE may construct a logged measurement entry without serving cell information, e.g. serving cell identity or measurement results of serving cell, if the UE undergoes out-of-service. Instead, the UE may construct the logged measurement entry to include indication indicating that the UE undergoes out-of-service. In this embodiment, undergoing out-of-service may be considered as the any cell selection state.

In other words, when the UE in RRC_IDLE is in any cell selection state, the UE may set the logged measurement entry to include an indicator indicating that the UE undergoes out-of-service. Thus, the logged measurement entry may include the indicator corresponding to the out-of-service area and available measurement results corresponding to last serving cells which the UE was camping on. For example, when the UE in RRC_IDLE is in any cell selection state, the UE may set the cell identity and/or cell quality to one fixed value which is promised between the network and the UE e.g., zero or max value as the serving cell information to indicate the any cell selection state or out-of-service. That is, the UE may construct the logged measurement entry to include an indicator indicating that suitable cell or acceptable cell is not found. The indicator may be replace the cell ID and measurement result, but also may be added to the cell ID and measurement result.

In an exemplary embodiment, the UE may set the field servCellIdentity of the current logged measurement entry as zero or max value to indicate out-of-service area. Further, the UE may set the field measResultServCell of the current logged measurement entry as zero or max value to indicate invalid.

If the UE is in any cell selection state or if the cell identity is not available or the UE is in out-of-service, the UE may include the indicator which indicates at least one of:

Logged information is measured during out-of-service, OR
Logged information is measured during the UE is in any cell selection state, OR
Logged information is measured during the cell identity is not available, OR
Logged information is measured to detect of out of service.

According to another embodiment of the present invention, when at least one of the above conditions is met, the UE may apply second logging time interval. Desirably, the second logging time interval may be shorter than the first logging time interval. The first logging time interval may be an initial logging time interval. The network may indicate the UE to acquire the out-of-service area information for MDT, but the UE also may be preconfigured to acquire the out-of-service area information for MDT. Before storing or logging the out-of-service area information for MDT, UE may remove the oldest entry if necessary to secure storage for information on out-of-service area.

Whenever the UE enters RRC_CONNECTED state to a new cell of the network, the UE may inform that logged MDT including information on out-of-service area is available to the new cell via RRC signaling message if the UE has logged information.

According to embodiments of the present invention, network may figure out the out-of-service area based on the logged measurement results which includes the out-ofservice indicator. Specifically, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells. Thus, in the prior art, network cannot infer whether it is out-of-service or not from measurement results only.

According to an embodiment of the present invention, the UE may perform measurement logging procedure as follow, while T330 is running:
1> if measurement logging is suspended:
2> if during the last logging interval the IDC problems detected by the UE is resolved, resume measurement logging;
1> if not suspended, perform the logging in accordance with the following:
2> if targetMBSFN-AreaList is included in VarLogMeasConfig:
3> if the UE is camping normally on an E-UTRA cell or is connected to E-UTRA; and
3> if the RPLMN is included in plmn-IdentityList stored in VarLogMeasReport; and
3> if the PCell (in RRC_CONNECTED) or cell where the UE is camping (in RRC_IDLE) is part of the area indicated by areaConfiguration if configured in VarLogMeasConfig:
4> for MBSFN areas, indicated in targetMBSFN-AreaList, from which the UE is receiving MBMS service:
5> perform MBSFN measurements in accordance with the performance requirements;

When configured to perform MBSFN measurement logging by targetMBSFN-AreaList, the UE is not required to receive additional MBSFN subframes, i.e. logging is based on the subframes corresponding to the MBMS services the UE is receiving.
5> perform logging at regular time intervals as defined by the loggingInterval in VarLogMeasConfig, but only for those intervals for which MBSFN measurement results are available;
2> else if:
3> if the UE is in any cell selection state:
4> perform the logging at regular time intervals, as defined by the loggingInterval in VarLogMeasConfig;
3> else if the UE is camping normally on an E-UTRA cell and if the RPLMN is included in plmn-IdentityList stored in VarLogMeasReport and, if the cell is part of the area indicated by areaConfiguration if configured in VarLogMeasConfig:
4> perform the logging at regular time intervals, as defined by the loggingInterval in VarLogMeasConfig;
2> when adding a logged measurement entry in VarLogMeasReport, include the fields in accordance with the following:
3> if the UE detected IDC problems during the last logging interval:
4> if measResultServCell in VarLogMeasReport is not empty:
5> include InDeviceCoexDetected;
5> suspend measurement logging from the next logging interval;
4> else:
5> suspend measurement logging;

The UE may detect the start of IDC problems.

3> set the relativeTimeStamp to indicate the elapsed time since the moment at which the logged measurement configuration was received;
3> if detailed location information became available during the last logging interval, set the content of the locationInfo as follows:
4> include the locationCoordinates;
3> if wlan-NameList is included in VarLogMeasConfig:
4> if detailed WLAN measurements are available:
5> include logMeasResultListWLAN, in order of decreasing RSSI for WLAN APs;
3> if bt-NameList is included in VarLogMeasConfig:
4> if detailed Bluetooth measurements are available:
5> include logMeasResultListBT, in order of decreasing RSSI for Bluetooth beacons;
3> if targetMBSFN-AreaList is included in VarLogMeasConfig:
4> for each MBSFN area, for which the mandatory measurements result fields became available during the last logging interval:
5> set the rsrpResultMBSFN, rsrqResultMBSFN to include measurement results that became available during the last logging interval;
5> include the fields signallingBLER-Result or dataBLER-MCH-ResultList if the concerned BLER results are available,
5> set the mbsfn-AreaId and carrierFrequency to indicate the MBSFN area in which the UE is receiving MBSFN transmission;
4> if in RRC_CONNECTED:
5> set the servCellIdentity to indicate global cell identity of the PCell;
5> set the measResultServCell to include the layer 3 filtered measured results of the PCell;
5> if available, set the measResultNeighCells to include the layer 3 filtered measured results of SCell(s) and neighbouring cell(s) measurements that became available during the last logging interval, in order of decreasing RSRP, for at most the following number of cells: 6 intra-frequency and 3 inter-frequency cells per frequency and according to the following:
6> for each cell included, include the optional fields that are available;
5> if available, optionally set the measResultNeighCells to include the layer 3 filtered measured results of neighbouring cell(s) measurements that became available during the last logging interval, in order of decreasing RSCP(UTRA)/RSSI(GERAN)/PilotStrength(cdma2000), for at most the following number of cells: 3 inter-RAT cells per frequency (UTRA, cdma2000)/set of frequencies (GERAN), and according to the following:
6> for each cell included, include the optional fields that are available;
4> if in RRC_IDLE:
5> set the servCellIdentity to indicate global cell identity of the serving cell;
5> set the measResultServCell to include the quantities of the serving cell;
5> if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency and according to the following:

6> for each neighbour cell included, include the optional fields that are available;
5> if available, optionally set the measResultNeighCells, in order of decreasing ranking-criterion as used for cell re-selection, to include neighbouring cell measurements that became available during the last logging interval, for at most the following number of cells: 3 inter-RAT cells per frequency (UTRA, cdma2000)/set of frequencies (GERAN), and according to the following:
6> for each cell included, include the optional fields that are available;
4> for the cells included according to the previous (i.e. covering previous and current serving cells as well as neighbouring EUTRA cells) include results according to the extended RSRQ if corresponding results are available according to the associated performance requirements;
4> for the cells included according to the previous (i.e. covering previous and current serving cells as well as neighbouring EUTRA cells) include RSRQ type if the result was based on measurements using a wider band or using all OFDM symbols;

The UE includes the latest results in accordance with the performance requirements. E.g. RSRP and RSRQ results are available only if the UE has a sufficient number of results/receives a sufficient number of subframes during the logging interval.

3> else:
4> if the UE is in any cell selection state:
5> set anyCellSelectionDetected to indicate the detection of no suitable or no acceptable cell found;
5> set the servCellIdentity to indicate global cell identity of the last logged cell that the UE was camping on;
5> set the measResultServCell to include the quantities of the last logged cell the UE was camping on.

The field anyCellSelectionDetected may indicate the detection of any cell selection state or any cell selection state. The UE in any cell selection state may set this field when performing the logging of measurement results in RRC_IDLE and there is no suitable cell or no acceptable cell. Further, the field servCellIdentity may indicate ID of serving cell. Further, the field measResultServCell may indicate measurement result of the serving cell.

Alternatively, if the UE is in any cell selection state, the UE may operates as below.
4> if no suitable cell is found at the current logging interval and the outOfServiceLog is included in VarLogMeasConfig:
5> set outOfServiceDetected to indicate the detection of out of service;
5> set the servCellIdentity to indicate global cell identity of the last logged cell that the UE was camping on;
5> set the measResultServCell to include the quantities of the last logged cell the UE was camping on.

The field outOfServiceLog may indicate logged indication for out-of-service area. The field outOfServiceDetected may indicate that the out-of-service area is detected. For that, the UE, upon receiving the LoggedMeasurementConfiguration message, shall store the received outOfServiceLog, if included, in VarLogMeasConfig.

Figure 8:
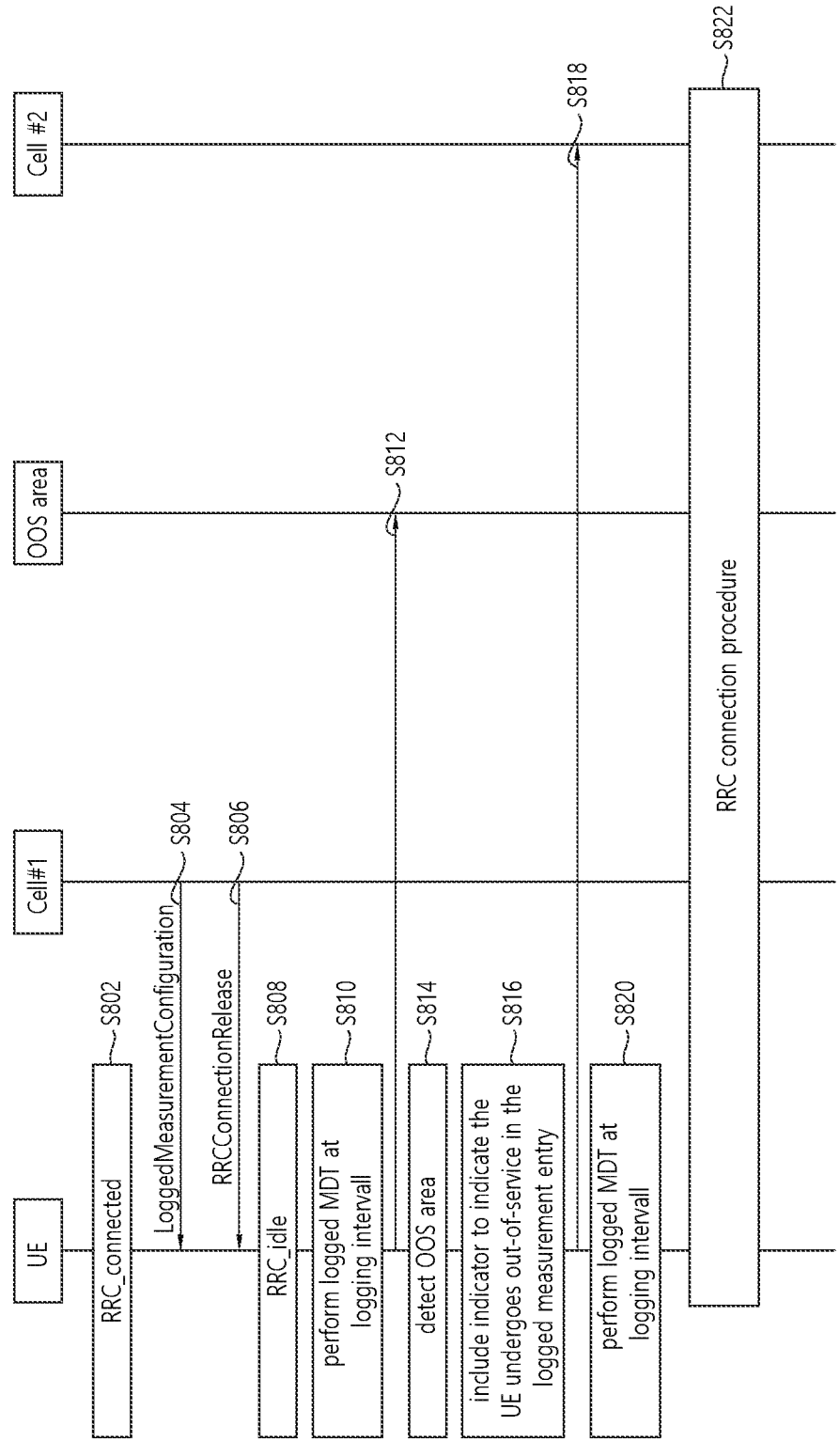
FIG. 8 shows a method for constructing logged measurement entry according to an embodiment of the present invention.

FIG. 8 shows a method for constructing logged measurement entry according to an embodiment of the present invention.

In step S802, the UE is in RRC_CONNECTED state on a serving cell. In this embodiment, the serving cell may be cell #1.

In step S804, the UE may receive configuration for logged measurement from the serving cell. An eNB of the serving cell inform to the UE that setting the last serving cell information as the serving cell information of a current logged measurement entry. Or, the eNB may inform to the UE that setting log value indicating out-of-service when the UE is in out-of-service area.

In step S806, the UE may receive RRC connection release message from the serving cell.

In step S808, the UE may enter RRC_IDLE state.

In step S810, the UE may perform logged MDT procedure at logging interval. During the MDT procedure, the UE may acquire measurement result of the serving cell. The UE may log the ID and the measurement result of the current serving cell.

In step S812, the UE may move to out-of-service area during DRX period.

In step S814, the UE may detect out-of-service area at logging interval. When at least one of the following conditions is met, the UE may perform logging available measurement results of at least one of serving cell, neighbor cell and UE information. The available measurement results may be measurement results acquired in camped on normally state.

When UE enters any cell selection state from camped on normally state

When UE enters any cell selection state from camped on any cell state

When serving cell quality, e.g. RSRP, RSRQ or SINR, becomes worse than a threshold configured by network When UE enters out-of-service If the UE performs only periodic logging, the UE cannot log the accurate information on out-of-service area. Thus, the UE may perform logging at the time when the UE detects the out-of-service area.

In step S816, the UE may include indicator to indicate the UE undergoes out-of-service in the logged measurement entry. In this embodiment, the logged measurement entry may include UE location information and measurement result of area which is related with the UE location information.

According to embodiments of the present invention, network can figure out the out-of-service area based on the logged measurement results which includes the out-of-service indicator. Specifically, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells. Therefore, network cannot infer whether it is out-of-service or not from measurement results only.

In step S818, the UE may move to a new serving cell, e.g. cell #2, during DRX period.

In step S820, the UE may perform logged MDT procedure at logging interval. During the MDT procedure, the UE may acquire measurement result of the new serving cell. The UE may log the ID and the measurement result of the current serving cell. Further, the UE may include an indicator to indicate that the UE enters out of service in a logged measurement entry.

When at least one of the following condition is met, the UE may perform logging available measurement results of at least one of serving cell, neighbor cell and UE information.

When UE enters camped on normally state from any cell selection state.

When UE enters camped on any cell state from any cell selection state.

When serving cell quality, e.g. RSRP, RSRQ or SINR, becomes batter than a threshold configured by network.

When UE recovers normal operation from out-of-service

If the UE performs only periodic logging, the UE cannot log the accurate information on out-of-service area. Thus, the UE may perform logging at the time when the UE detects the out-of-service area.

According to embodiments of the present invention, network may be able to know the accurate end point of the out-of-service area compared to a UE which performs only periodic logging, because the periodic logging UE may not perform logging when it escapes the out-of-service area.

In step S822, the UE may perform RRC connection procedure. By the RRC connection procedure, the UE may inform that the logged information is available.

According to embodiments of the present invention, the network may acquire information on out-of-service area based on the indication included in the logged measurement entry indicating that the UE undergoes the out-of-service area.

According to another embodiment of the present invention, the UE which is configured to perform only when it undergoes out-of-service may start the periodic logging, when at least one of the following conditions is met.

If UE enters any cell selection state, or
If serving cell quality, e.g. RSRP, RSRQ or SINR, becomes worse than a threshold, or
If UE enters out-of-service.
If UE is not able to detect any cells for which S criteria is fulfilled.
If no suitable or acceptable cell can be found.

The UE may stop the periodic logging, when at least one of the following conditions is met.

If serving cell (=camping cell) quality becomes batter than a threshold, or
If UE enters camped on normally state from any cell selection state, or
If UE finds suitable cell, or
If UE finds acceptable cell, or
If UE recovers normal operation from out-of-service.

In this embodiment, the UE may not start the logging when it enters RRC_IDLE/INACTIVE state though it received the logged measurement configuration from network. The logged measurement configuration also may include information to indicate when to start/stop the logging, e.g. serving cell threshold or UE state.

In legacy logged measurement, UE starts the logging when it becomes RRC_IDLE state after receiving the logged measurement configuration. The UE performs logging periodically even though the serving cell quality very high. However, if the purpose of the logged measurement is to find out the out-of-service area, UE doesn't need to report the measurement results which were measured when the serving cell quality is good.

Furthermore, if UE performs logging good measurement results, the memory reserved for the logged measurement information becomes full with unnecessary information (=good measurement results). When the memory reserved for the logged measurement information becomes full, UE is allowed to discard stored logged measurements. If UE performs logging only when the serving cell quality is bad, such a situation can be avoided.

Figure 9:
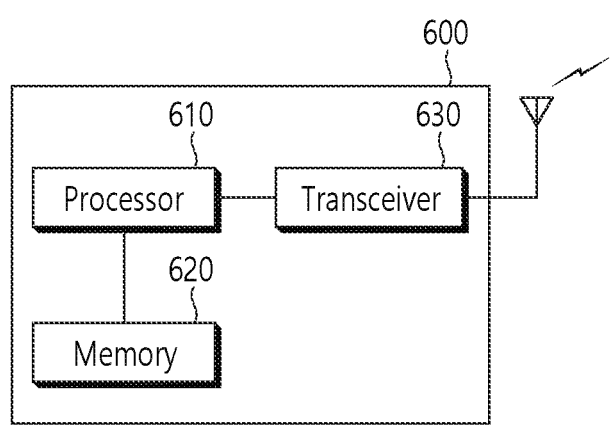
FIG. 9 shows a UE to implement an embodiment of the present invention

FIG. 9 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to receive a logged measurement configuration from a network.

The processor 610 is configured to perform measurement logging based on the received logged measurement configuration. When the UE is in any cell selection state, the logged measurement may include indicator indicating that there is no suitable cell or no acceptable cell with available measurement results. The available measurement results may include measurement result of a last serving cell. The processor 610 may adjust logging time interval, when the UE is in any cell selection state. The logging time interval may be adjusted to be shorter. The processor 610 may further start a periodic logging when a serving cell quality becomes worse than a threshold. The processor 610 may further stop the periodic logging, when the serving cell quality becomes better than the threshold. The processor 610 may further construct logged measurement entry to include indicator indicating that the UE escapes from out-of-service state, when the UE recovers from the any cell selection state. The logged measurement may be constructed when the UE is in radio resource control (RRC) idle state. The UE may further configured to perform logging available measurement results at a time point that the UE enters the any cell selection state. The UE may further configured to perform logging available measurement results at a time point that the UE enters camped on normally state.

The processor 610 is configured to transmit the logged measurement to the network. The logged measurement may be transmitted when the UE is in RRC connected state.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiment of the present invention shown in FIG. 9, the network can figure out the out-of-service area based on the logged measurement results which includes the out-of-service indicator. Specifically, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells. Therefore, network cannot infer whether it is out-of-service or not from measurement results only.

Figure 10:
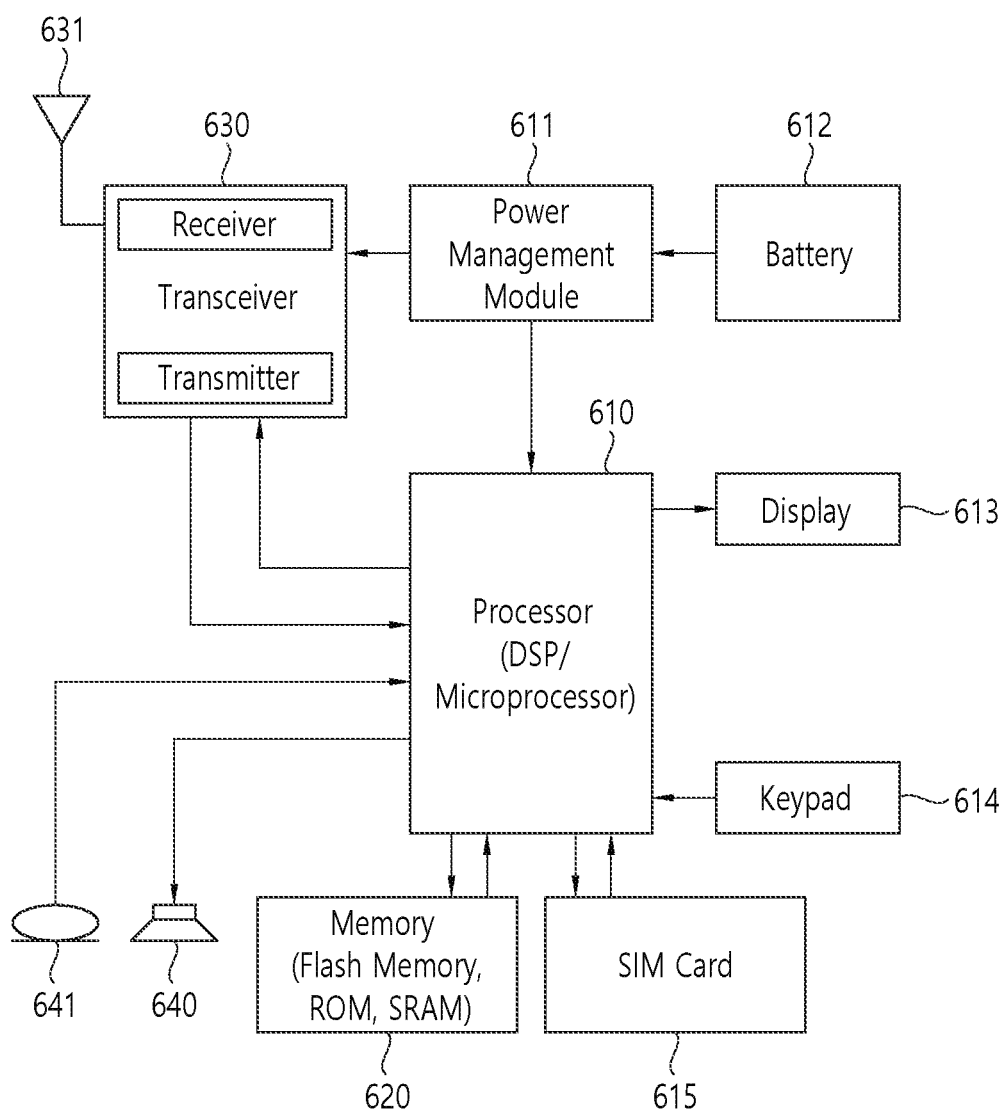
FIG. 10 shows more detailed UE to implement an embodiment of the present invention.

FIG. 10 shows more detailed UE to implement an embodiment of the present invention. The present invention described above for UE side may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to receive a logged measurement configuration from a network.

The processor 610 is configured to perform measurement logging based on the received logged measurement configuration. When the processor 610 is in any cell selection state, the logged measurement may include indicator indicating that there is no suitable cell or no acceptable cell with available measurement results. The available measurement results may include measurement result of a last serving cell. The processor 610 may adjust logging time interval, when the UE is in any cell selection state. The logging time interval may be adjusted to be shorter. The processor 610 may further start a periodic logging when a serving cell quality becomes worse than a threshold. The processor 610 may further stop the periodic logging, when the serving cell quality becomes better than the threshold. The processor 610 may further construct logged measurement entry to include indicator indicating that the UE escapes from out-of-service state, when the UE recovers from the any cell selection state. The logged measurement may be constructed when the UE is in radio resource control (RRC) idle state. The UE may further configured to perform logging available measurement results at a time point that the UE enters the any cell selection state. The UE may further configured to perform logging available measurement results at a time point that the UE enters camped on normally state.

The processor 610 is configured to transmit the logged measurement to the network. The logged measurement may be transmitted when the UE is in RRC connected state.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 10, the network can figure out the out-of-service area based on the logged measurement results which includes the out-of-service indicator. Specifically, if the out-of-service indicator is not provided in a logged measurement entry, network cannot know whether the UE was in out-of-service or not when the logged measurement entry was constructed, because the threshold to decide out-of-service can be different for each cell and the cell which receives the logged measurement report doesn't know the threshold for all neighbor cells. Therefore, network cannot infer whether it is out-of-service or not from measurement results only.

Figure 11:
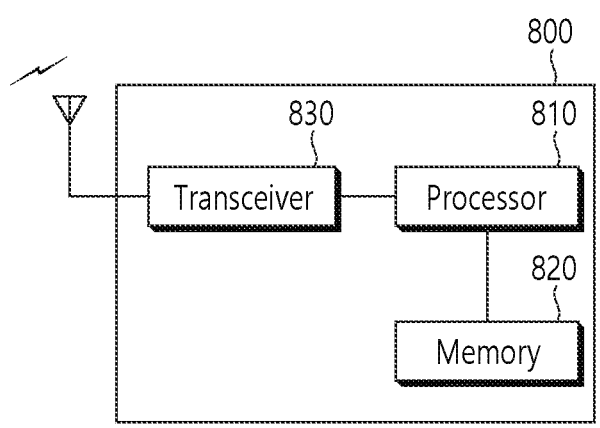
FIG. 11 shows a network node to implement an embodiment of the present invention.

FIG. 11 shows a network node to implement an embodiment of the present invention. The present invention described above for network side may be applied to this embodiment.

A network node 800 includes a processor 810, a memory 820 and a transceiver 830. The processor 810 may be configured to implement proposed functions, procedures and/or methods described in this description. Layers of the radio interface protocol may be implemented in the processor 810.

Specifically, the processor 810 is configured to control the transceiver 803 to receive logged measurement entry including indicator indicating that there is no suitable cell or no acceptable cell.

The processor 810 may be configured to determine that any cell selection state is detected. That is, the processor may realize that the area corresponding to the indicator is out-of-service area.

The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

According to embodiment of the present invention shown in FIG. 11, the network may acquire information on out-of-service area based on the indication included in the logged measurement entry indicating that the UE undergoes the out-of-service area.

In this document, the term "/" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) configured to operate in a wireless communication system, the method comprising:
   receiving, from a network, a logged measurement configuration including an event type for triggering the UE to perform logging of available measurements;
   while the UE is in RRC_IDLE and RRC_INACTIVE:
   1) Based on the event type being set to a first event type: i) performing the logging at regular time intervals only when the UE is in "any cell selection" state and ii) performing the logging upon transition from the "any cell selection state" to "camped normally" state,
   wherein the logging includes information indicating detection of no suitable cell or no acceptable cell found, based on the UE being in the "any cell selection" state; and
   2) Based on the event type being set to a second event type, performing the logging at regular time intervals only when a condition in which a serving cell quality is worse than a serving cell quality threshold is met; and transmitting, to the network, results of the logging.

2. The method of claim 1, wherein the results of the logging include a measurement result of a last serving cell based on the event type being set to the first event type.

3. The method of claim 1, wherein the logging is not performed when the UE enters RRC_IDLE and RRC_INACTIVE.

4. The method of claim 1, wherein the logging is started when the UE enters the "any cell selection" state in RRC_IDLE and RRC_INACTIVE and is stopped when the UE leaves the "any cell selection" state in RRC_IDLE and RRC_INACTIVE, based on the event type being set to the first event type.

5. The method of claim 1, wherein the logging is started when the condition is met and is stopped when the condition is not met, based on the event type being set to the second event type.

6. A wireless device configured to operate in a wireless communication system, the wireless device comprising:
   at least one transceiver;
   at least one processor; and
   at least one computer memory operably connectable to the at least one processor and storing instructions that, based on being executed by the at least one processor, perform operations comprising:
   receiving, from a network via the at least one transceiver, a logged measurement configuration including an event type for triggering the wireless device to perform logging of available measurements;
   while the wireless device is in RRC_IDLE and RRC_INACTIVE:
   1) Based on the event type being set to a first event type: i) performing the logging at regular time intervals only when the wireless device is in "any cell selection" state and ii) performing the logging upon transition from the "any cell selection state" to "camped normally" state,
   wherein the logging includes information indicating detection of no suitable cell or no acceptable cell found, based on the wireless device being in the "any cell selection" state; and
   2) Based on the event type being set to a second event type, performing the logging at regular time intervals only when a condition in which a serving cell quality is worse than a serving cell quality threshold is met; and transmitting, to the network via the at least one transceiver, results of the logging.

7. The wireless device of claim 6, wherein the results of the logging include a measurement result of a last serving cell based on the event type being set to the first event type.

8. The wireless device of claim 6, wherein the logging is not performed when the wireless device enters RRC_IDLE and RRC_INACTIVE.

9. The wireless device of claim 6, wherein the logging is started when the wireless device enters the "any cell selection" state in RRC_IDLE and RRC_INACTIVE and is stopped when the wireless device leaves the "any cell selection" state in RRC_IDLE and RRC_INACTIVE, based on the event type being set to the first event type.

10. The wireless device of claim 6, wherein the logging is started when the condition is met and is stopped when the condition is not met, based on the event type being set to the second event type.

11. A processing apparatus configured to control a user equipment (UE) in a wireless communication system, the processing apparatus comprising:
- at least one processor; and
- at least one memory coupled to the at least one processor,
- wherein the at least one processor is configured to perform operations comprising:
- obtaining a logged measurement configuration including an event type for triggering the UE to perform logging of available measurements;
- while the UE is in RRC_IDLE and RRC_INACTIVE:
  1) Based on the event type being set to a first event type: i) performing the logging at regular time intervals only when the UE is in "any cell selection" state and ii) performing the logging upon transition from the "any cell selection state" to "camped normally" state,
  wherein the logging includes information indicating detection of no suitable cell or no acceptable cell found, based on the UE being in the "any cell selection" state; and
  2) Based on the event type being set to a second event type, performing the logging at regular time intervals only when a condition in which a serving cell quality is worse than a serving cell quality threshold is met; and controlling the UE to transmit results of the logging.

12. The processing apparatus of claim 11, wherein the results of the logging include a measurement result of a last serving cell based on the event type being set to the first event type.

13. The processing apparatus of claim 11, wherein the logging is not performed when the UE enters RRC_IDLE and RRC_INACTIVE.

14. The processing apparatus of claim 11, wherein the logging is started when the UE enters the "any cell selection" state in RRC_IDLE and RRC_INACTIVE and is stopped when the UE leaves the "any cell selection" state in RRC_IDLE and RRC_INACTIVE, based on the event type being set to the first event type.

15. The processing apparatus of claim 11, wherein the logging is started when the condition is met and is stopped when the condition is not met, based on the event type being set to the second event type.

* * * * *